United States Patent [19]

Lee et al.

[11] Patent Number: 5,191,563
[45] Date of Patent: Mar. 2, 1993

[54] METHOD FOR INCREASING TRACK DENSITY OF MAGNETO-OPTICAL STORAGE MEDIA

[75] Inventors: Neville K. S. Lee, Sherborn; Paul H. Schmidt, West Boylston, both of Mass.

[73] Assignee: Digital Equipment Corporation, Maynard, Mass.

[21] Appl. No.: 373,939

[22] Filed: Jun. 29, 1989

[51] Int. Cl.$^5$ .................................... G11B 11/00
[52] U.S. Cl. .................................... 369/13; 369/275.3
[58] Field of Search ............. 369/13, 14, 275.1, 275.2, 369/275.3, 275.4, 283, 284, 285, 286, 288; 428/693, 694, 611; 360/59, 114

[56] References Cited

U.S. PATENT DOCUMENTS

| | | | |
|---|---|---|---|
| 4,176,377 | 11/1979 | Howe | 369/121 |
| 4,322,125 | 3/1982 | Warren | 350/1.6 |
| 4,403,318 | 9/1983 | Nagashima | 369/100 |
| 4,412,264 | 10/1983 | Imanura et al. | 369/13 |
| 4,423,502 | 12/1983 | Dil | 369/275.3 |
| 4,513,407 | 4/1985 | Bricot | 369/111 |
| 4,516,234 | 5/1985 | Nakagawa | 369/109 |
| 4,616,237 | 10/1986 | Pettigrew et al. | 346/135.1 |
| 4,703,469 | 10/1987 | Pettigrew et al. | 369/275.3 |
| 4,724,444 | 2/1988 | Pettigrew et al. | 346/1.1 |
| 4,733,385 | 3/1988 | Henmi et al. | 369/13 |
| 4,737,947 | 4/1988 | Osato et al. | 369/13 |
| 4,758,307 | 7/1988 | Pettigrew et al. | 156/643 |
| 4,786,585 | 11/1988 | Humberstone et al. | 430/461 |
| 4,816,841 | 3/1989 | Kobayashi et al. | 346/76 |
| 4,893,299 | 1/1990 | Humberstone et al. | 369/275.4 |
| 4,918,661 | 4/1990 | Yamuchi | 369/275.1 |
| 4,947,384 | 8/1990 | Suzuki et al. | 369/275.1 |
| 4,949,330 | 8/1990 | Pasman et al. | 369/275.1 |
| 4,957,825 | 9/1990 | Futamoto et al. | 369/13 |

OTHER PUBLICATIONS

Published European application No. 0 195 227, printed Sep. 24, 1986.
Published European application No. 0 282 744, printed Sep. 21, 1988.
Published European application No. 0 291 248, printed Nov. 17, 1988.
Gardner et al., "Plasmon Media Technology", Technical Digest of IEEE/OSA Topical Meeting on Optical Data Storage, Washington, 1985, paper WDD4.
Gardner et al., "Volume Production of Plasmon Optical Discs", Technical Digest of IEEE/OSA Topical Meeting on Optical Data Storage, Washington, 1985, paper WDD5.
Suh et al., "Signal-to-Noise Measurements on Textured Optical Storage Media", Proc. SPIE Opt. Data Storage, vol. 382, Incline Village, Nev., 1983, pp. 196-199.

Primary Examiner—Eugene R. LaRoche
Assistant Examiner—Tan Nguyen
Attorney, Agent, or Firm—Fish & Richardson

[57] ABSTRACT

An optical data storage medium has, on one face, a recording track and a non-recording track for high-density magneto-optical recording. The media is manufactured by sputtering magnetic material onto a surface with alternating tracks of rough and smooth textures. Alternatively, the media may be manufactured by depositing a coating of hydrogenated carbon composition and exposing the coating to ion bombardment, or by sputtering or angular deposition of magnetic material onto a corrugated surface.

15 Claims, 10 Drawing Sheets

FIG.7F $d_2 = d_1 \cos\theta$

METHOD FOR INCREASING TRACK DENSITY OF MAGNETO-OPTICAL STORAGE MEDIA

CROSS-REFERENCE TO RELATED APPLICATION

The present application is related to application Serial No. 07/373,991, filed on the same day as this application by Neville K.S. Lee, entitled "Method for Increasing Linear Bit Density in Magneto-Optical Storage Media", assigned to the same assignee as the present application, and incorporated by reference herein in its entirety.

BACKGROUND OF THE INVENTION

This invention relates to techniques for increasing the density of recorded digital information on magneto-optical storage media.

The exploding demand for computer memory has propelled current research in memory systems in the direction of magnetooptical (M-0) technology. The M-0 medium, typically in the form of a disk, comprises a thin magnetic layer covered with a relatively thick transparent coating. Digital information is stored in the M-0 medium by locally magnetized regions or "domains" in the magnetic layer of one polarity or another corresponding to 1's" and "0's". While the information is thus retained magnetically in a manner analogous to conventional magnetic media, the writing and reading processes usually involve laser beams. M-0 writing is thermally assisted. A pulsed laser beam is focused through the transparent overcoat onto the surface of the magnetic layer. The coercivity of the magnetic media exposed to the beam is temporarily lowered by the heat induced by the laser pulse, enabling the local orientation of the magnetic domains to be redirected by means of a magnetic field. Reading is accomplished through Kerr or Faraday rotation of the angle of polarization of a low power (non-heating) incident laser beam (ordinarily supplied by the same laser used in writing). Depending on the local orientation of the magnetic media, the polarization angle of the reflected beam rotates slightly clockwise or counterclockwise. This shift in the polarization angle determines whether the cell contains a "1" or a "0".

Figure 1:
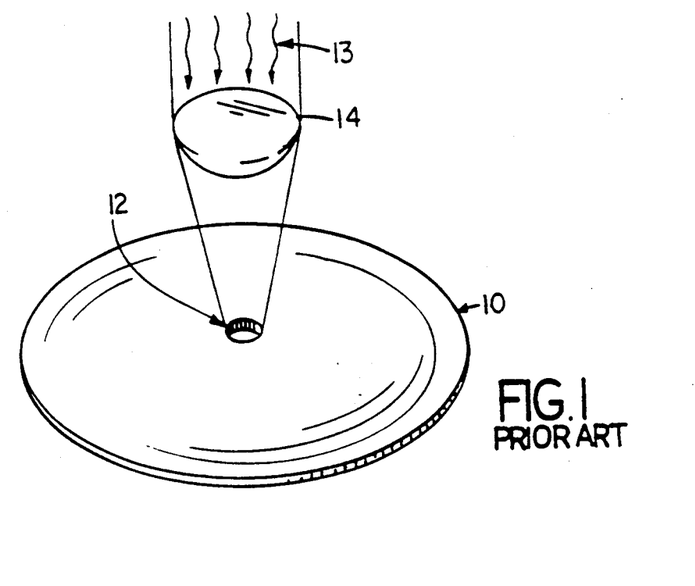
FIG. 1 is a diagram of a laser beam illuminating a prior art magneto-optical diskette as viewed in perspective.
Figure 2:
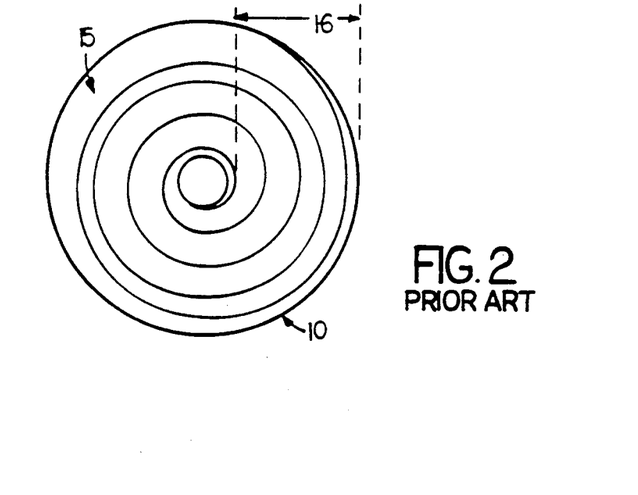
FIG. 2 is a diagrammatic top view of a prior art magnetooptical diskette showing the basic geometry of a spiral recording track structure.
Figure 3:
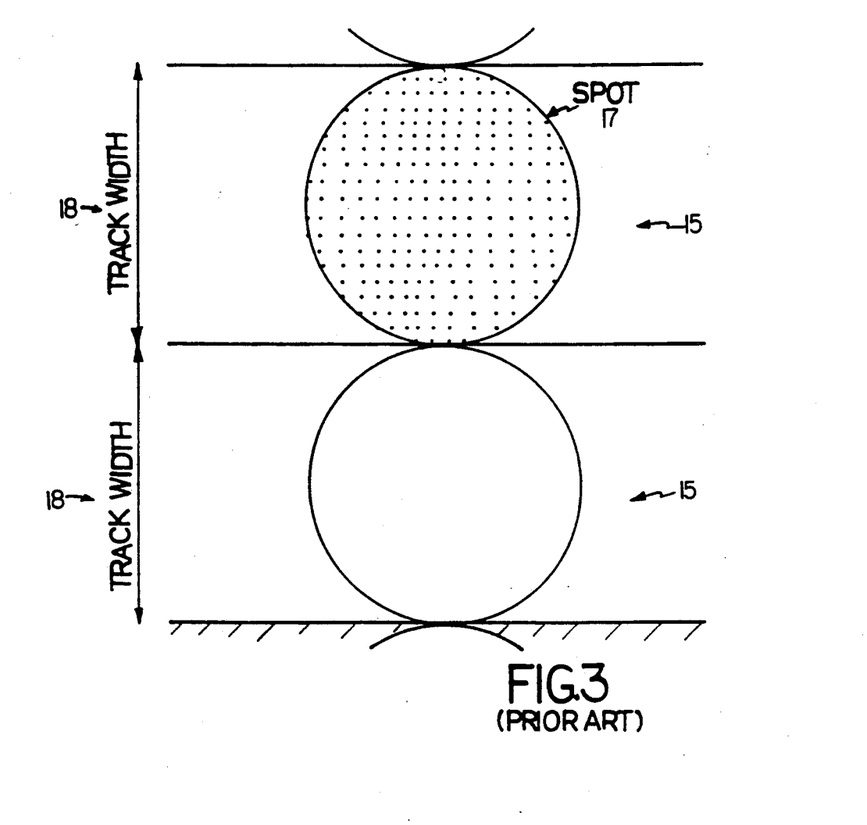
FIG. 3 is a schematic representation of the relative sizes of prior art magneto-optical domain tracks and the intense portions of the laser beam.

A known magneto-optical drive system is shown in FIG. 1. The diskette 10 is written and read by means of a focused laser beam 12. The beam 13 is focused by lens 14. As shown in FIG. 2, disk 10 contains, in a radial recording region 16 of one face 15, a spiral track of spaced magnetic domains. Alternatively, the recording region 16 can carry plural concentric circular tracks. As shown in FIG. 3, the track width 18 must be equal to or greater than the width of the intense portions of the focused laser beam 17 to avoid interference between domains in adjacent turns of the spiral magnetic track.

SUMMARY OF THE INVENTION

A general feature of the invention is an optical data storage medium, one medium face having interleaved tracks. At least one track is a recording track, and at least one other is a non-recording track. In this embodiment of the invention, the recording track and non-recording track do not intersect. The recording track is responsive to a recording signal for recording information by modulation of a physical property of the face of the medium other than reflectivity, and the non-recording track region is less responsive to the recording signal.

Another general feature of the invention is a magneto-optical disk having recording and non-recording tracks. The recording track comprises a continuous spiral through a given radial width of one disk face, and the non-recording track comprises a continuous spiral through the same radial width of this disk face.

Another general feature of the invention is an optical data storage apparatus having a storage medium and a mechanism for producing a light beam. The storage medium has recording and non-recording tracks as set forth above. The beam and the medium are embodied such that the cross-track width of the medium area swept out by the intense portion of the beam, added to the recording track width, is less than twice the recording track pitch.

Another feature of the invention is a method of manufacture of an optical data storage medium. This method comprises the steps of: providing a medium comprised of substantially inert material with respect to a given physical measurement; producing, on at least one medium face, regions denoted by varying elevations above the medium face; depositing, on the medium face, reactive material with respect to the physical measurement, such that at least one of the denoted regions accumulates substantially less reactive material than one other region.

Another feature of the invention is the method of manufacture of a magneto-optical storage medium as set forth above, where the denoted regions comprise continuous, non-intersecting tracks denoted by textured and smooth areas, substantially V-shaped grooves and flat ridges, or square grooves and flat ridges. In the latter case, the reactive material deposition is performed in accordance with a deposition angle, such that the grooves accumulate substantially less material than the ridges.

Another feature of the invention is a method of manufacture of an optical data storage medium. A medium comprised of substantially inert material with respect to a given physical measurement is provided. Reactive material with respect to the physical measurement is deposited on one medium face. A coating of a hydrogenated carbon composition (HCC) is formed above the reactive material, and the HCC coating is exposed to ion bombardment or implantation along continuous non-intersecting tracks such that the exposed tracks become substantially more absorbing to light.

Other advantages and features will become apparent from the following description of the preferred embodiments and from the claims.

DESCRIPTION OF THE PREFERRED EMBODIMENTS

We first briefly describe the drawings.

STRUCTURE

The embodiments of the invention described below are envisioned primarily for use in conjunction with magneto-optical disk technology. However, the invention is generally applicable to other optical disk technologies, such as phase transition, write once, and read only, including audio CD.

As seen in FIG. 1, a known magneto-optical diskette is written and read by a laser beam 13. The distribution of the focused laser beam 12 directly influences the density of information on the diskette. As seen in FIG. 2, information is written in a spiral track on one face 15 of the diskette. As seen in FIG. 3, the width 18 of this track must be equal to or greater than the diameter of the intense portion 17 of the focused laser beam in order to reduce interference of adjacent tracks.

In the invention, the face of a diskette or other medium is manufactured with two interleaved tracks. This medium may be manufactured simply and inexpensively according to the invention. In addition, simple, reliable, and non-destructive writing and erasure of the recorded information is achieved according to the invention.

Figure 4:
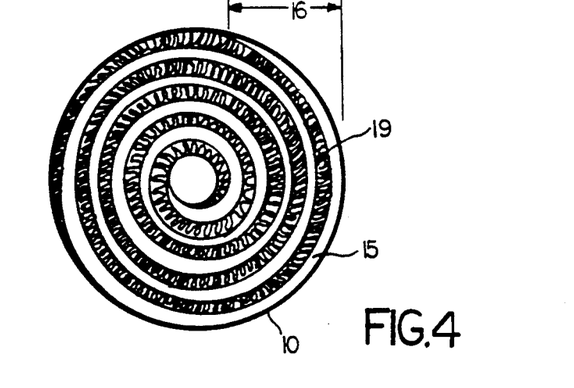
FIG. 4 is a diagrammatic top view of a magneto-optical medium showing the basic geometry of a dual-track structure.
Figure 5:
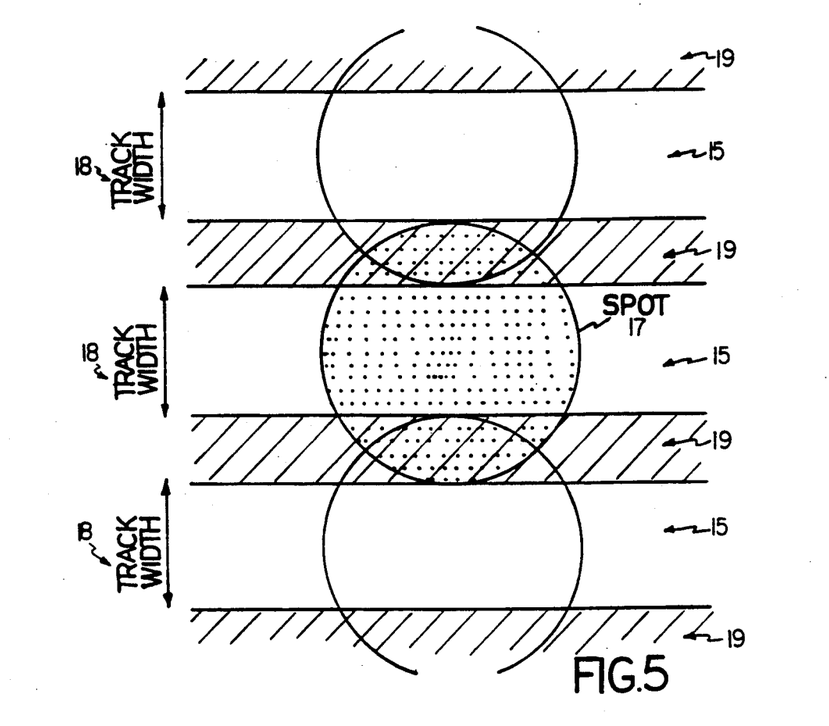
FIG. 5 is a schematic representation of the relative sizes of magneto-optical domain tracks and the intense portions of the laser beam.

FIG. 4 shows one embodiment of the invention, where the interleaved tracks are spirals. In FIG. 4, a recording track 15 and a non-recording track 19 form spiral paths through the face of the diskette 10. As seen in FIG. 5, the presence of the non-recording track 19 allows the intense portions of the focused laser beam to illuminate regions outside of the recording track 15. To maintain a suitable signal to noise ratio, the most intense portions of the focused beam may not illuminate more than one recording track 15. However, the most intense portions of the focused beam may illuminate the non-recording tracks 19 as shown in FIG. 5. The use of a non-recording track 19 thus allows adjacent recording tracks 15 to be more closely spaced than in the prior art because the intense portions of the focused laser beam may sweep through the same area 19 from one track to the next, whereas in the prior art, as shown in FIG. 3, the intense portions of the focused laser beam may not sweep through the same area from one track to the next. The extra recording density provided by the invention can be clearly seen by comparing the track pitch in FIG. 3 to the track pitch in FIG. 5.

Figure 6A:
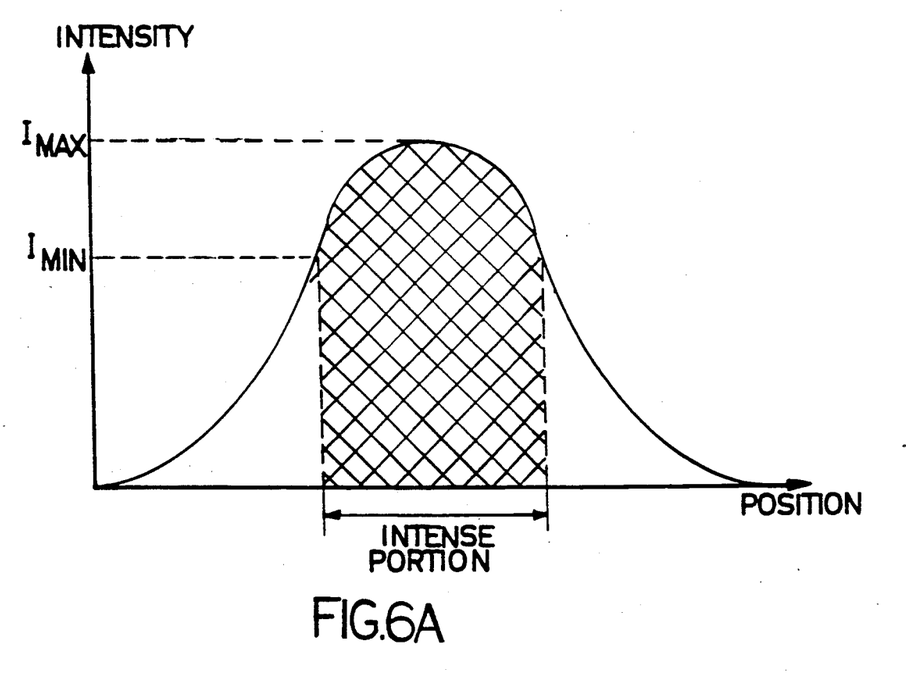
FIG. 6A is a plot of the spacial intensity of the laser beam versus displacement.

FIG. 6A clarifies the distribution of intensity of the focused laser beam. As can be seen in the plot of FIG. 6A, the intensity of the focused laser beam has a Gaussian distribution with respect to position. The majority of the power of this beam lies in the central region around the maximum intensity $I_{MAX}$. To achieve a tolerable signal to noise ratio, the intense regions of the focused beam (i.e. those regions with intensity greater than $I_{MIN}$, which is a given fraction of the maximum intensity) should not be allowed to produce interference. Therefore, these regions should not be allowed to illuminate adjacent recording tracks.

Figure 6B:
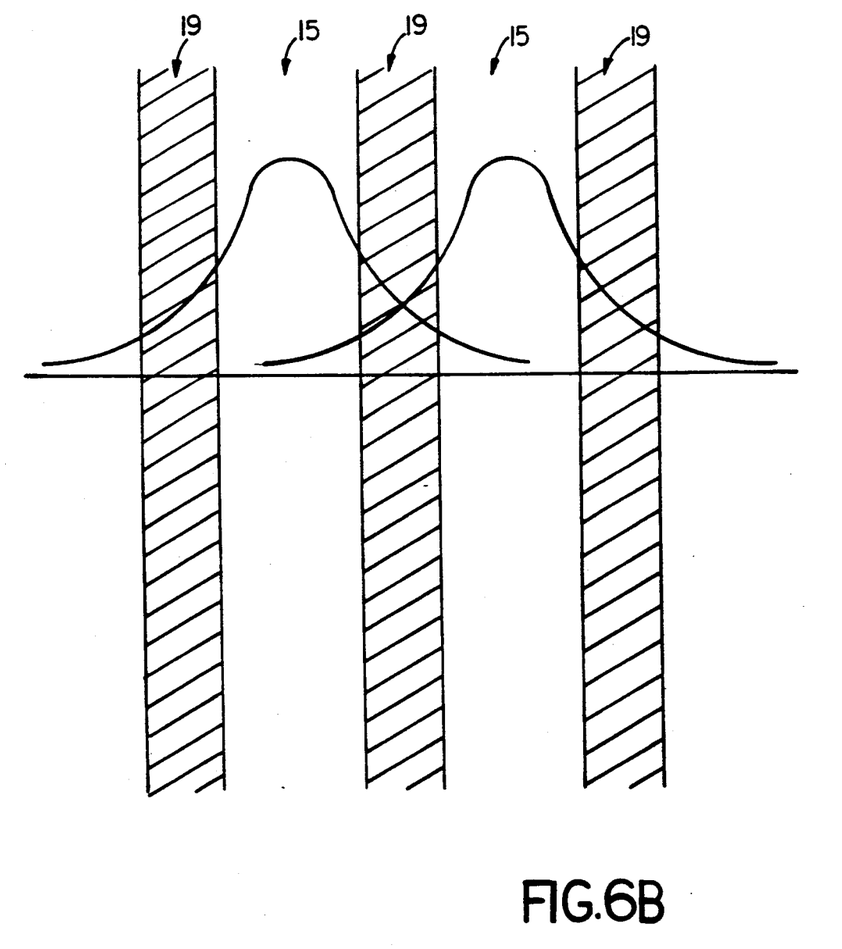
FIG. 6B is a plot of the spacial intensity of the laser beam as it illuminates a disk having a dual track structure.

Referring to FIG. 6B, the nature of the interference between recording tracks is illustrated. The Gaussian nature of the focused laser beam implies that some portions of the focused laser beam will illuminate adjacent recording tracks 15 regardless of the recording track pitch, and will create noise in the detected signal. However, if the ratio of the signal (response from the desired, central, recording track) to the noise (response from other recording tracks) is large, the error rate of the system is tolerable, and may be corrected by a suitable error correction code. As seen in FIG. 6B, the non-recording tracks 19 improve the signal-to-noise ratio by reducing the response from the non-recording regions directly adjacent to the desired recording track.

Figure 7A:
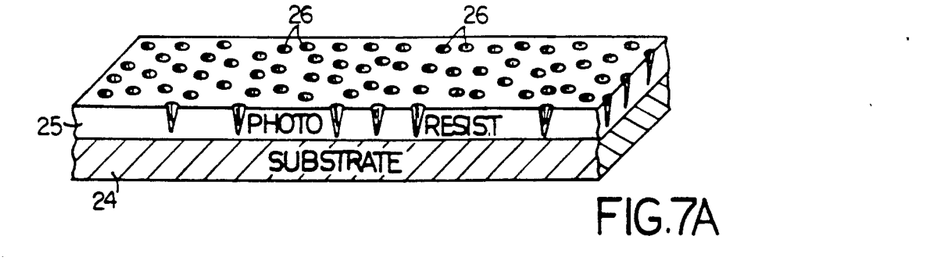
FIGS. 7A through 7C are diagrams illustrating the manufacture of a dual-track textured medium surface.

FIGS. 7A through 7D illustrate the preferred method of manufacture of a medium with recording and non-recording tracks. As shown in FIG. 7A, a prototype substrate 24 to be used as a pattern is coated with a negative-working photo-resist 25. The photo-resist 25 is then exposed to light through interferometry, creating a finely pitched pattern of exposed areas. In one embodiment of the invention, the exposure may follow the methods for creating a textured surface disclosed in U.S. Pat. No. 4,758,307 U.S. Pat. No. 4,616,237 and U.S. Pat. No. 4,724,444 issued respectively on Jul. 18, 1988, Oct. 7, 1986, and Feb. 9, 1988 to Pettigrew et al., incorporated by reference herein, and in Gardner et al, "Volume Production of Plasmon Optical Discs", Technical Digest of IEEE/OSA Topical Meeting on Optical Data Storage, Wash., 1985, paper WDD5, available from the IEEE in New York, N.Y., also incorporated by reference herein.

Figure 7B:
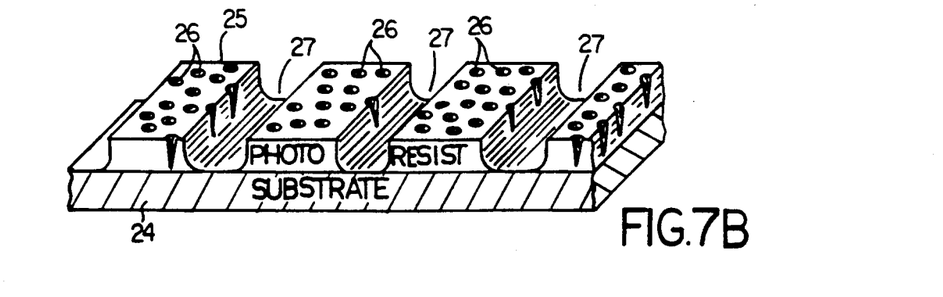

The result is a "speckled" pattern of exposed areas 26 in the photo-resistive material 25. As shown in FIG. 7B, a laser is then used to fully expose selected tracks 27 in the photo-resistive material 25. The exposed areas 26 and 27 of photo-resist are then washed off of the substrate 24 by conventional means, resulting in the textured surface containing the unremoved portions of the photoresist, as depicted in FIG. 7B. This textured surface is then metallized to form a metal master. The metal master is then used to press or cast copies of the textured surface in magnetically inert media by conventional means.

In one embodiment, the pressing or casting may be performed on a thick transparent plastic substrate, forming the overcoat to receive a layer of reflective metallization or magneto-optical material (or both), creating an optical or magneto-optical storage medium. In another embodiment, the pressing or casting may be performed on an opaque plastic substrate which then receives a layer of metallization or magneto-optical material (or both), and subsequently receives a transparent plastic overcoat.

Figure 7C:
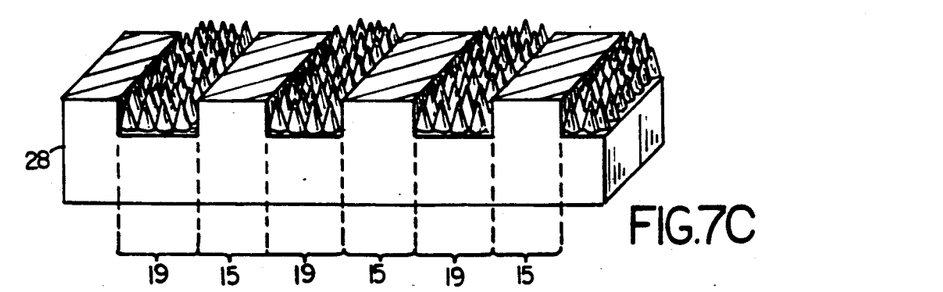
Figure 7D:
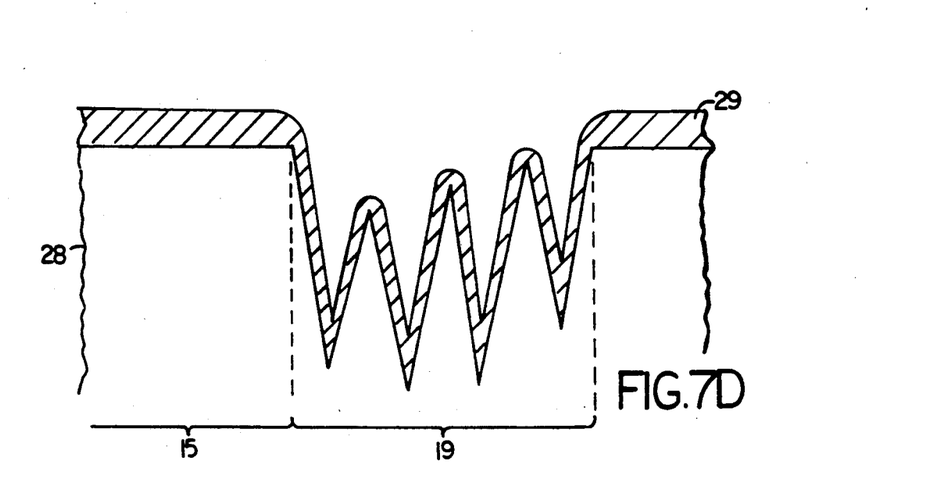
FIG. 7D is a schematic sectional view showing the sputtering of magnetic material on a textured medium to form dual tracks.

A pressed copy of the metal master is shown in FIG. 7C. In FIG. 7C, the textured pattern pressed into the copy is the negative of the textured surface in the metallized prototype medium shown in FIG. 7B. The resulting surface has roughened areas 19 and smooth areas 15. These areas will become the non-recording and recording tracks, respectively. As shown in FIG. 7D, magnetic material is sputtered onto the surface of the textured medium. Material accumulates evenly in the recording regions 15, but accumulates unevenly in the non-recording regions 19. The unevenly accumulated material in the non-recording regions 19 is less susceptible to magnetic recording than the evenly accumulated material in the recording regions 15, thus creating recording and non-recording tracks.

Figure 7E:
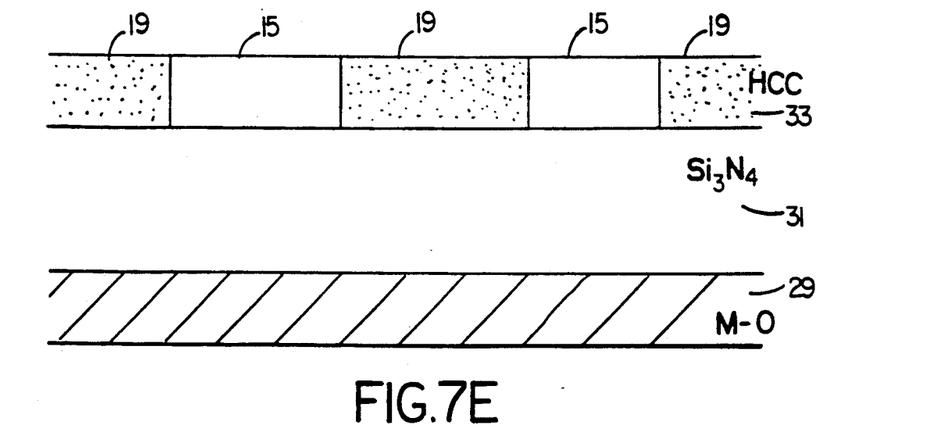
FIGS. 7E and 7F are schematic sectional views showing a layer of a hydrogenated carbon composition on an optical medium forming dual tracks of differing absorption.

Referring to FIG. 7E, an alternative method of manufacture of recording and non-recording track regions utilizes a hydrogenated carbon composition (HCC) coating. The medium is first deposited with magneto-optical material 29, and the magneto-optical material is covered with a layer 31 of suitable protective materials, such as silicon nitride ($Si_3N_4$) or aluminum nitride (AlN). Finally, a coating 33 of several hundred Angstroms of HCC is deposited over the protective nitride layer 31 by plasma assisted chemical vapor deposition. This coating 33 may be as disclosed in U.S. Pat. application Ser. No. 344,990 filed on Apr. 28, 1989, by Paul H. Schmidt et al, entitled "Hydrogenated Carbon Composition", assigned to the same assignee as the present application, and incorporated by reference herein in its entirety.

Figure 7F:
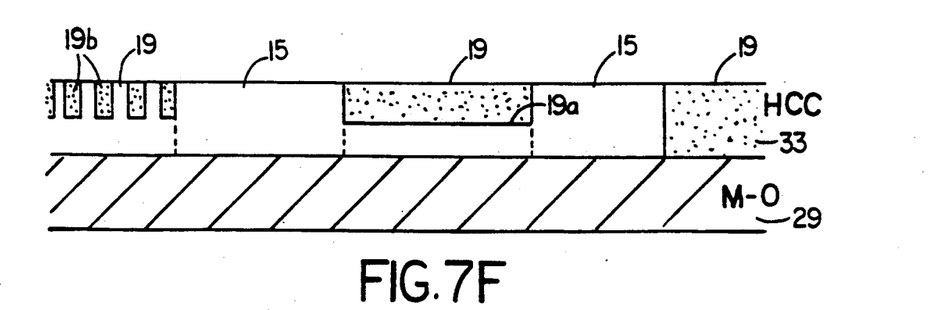

The HCC coating 33 is initially more than 60% transparent in the region of interest, but may be made less transparent (i.e., more absorbing) by Gallium liquid metal ion bombardment in selected areas. Materials other than gallium may also work. According to the invention, such implantation is used to form the non-recording bands 19, either by bulk irradiation of the medium using a lithographic mask, or by writing the bands with a high potential ion gun (for example, with potential greater than 10 kV). The energy level of the liquid metal write system can be adjusted locally to vary the depth of implantation to control the absorptivity of the affected areas, as shown, for example, at 19a in FIG. 7F, where the ion implantation stops short of the full depth of the HCC coating 33. In addition, the non-recording bands 19 do not necessarily have to be written at a uniform density. The energy level and resulting track opacity can be variegated. If desired, a nonrecording band can be composed of discrete closely spaced tracks or lines 19b as shown in FIG. 7F. Lines 19b can be sized and spaced so as to form a diffraction grating, if desired. Both systems, variable depth and nonuniform density, constitute means of controlling the degree of crosstalk from adjacent recording tracks.

The HCC coating 33 has useful anti-corrosion properties. Therefore, in other embodiments of the invention shown in FIG. 7F, the HCC coating 33 may be deposited directly over the magneto-optical material 29 to form a corrosion barrier.

The HCC coating also has lubricating properties. These may be used in other embodiments of the invention where a HCC coating is also used on the bottom surface of the optical head, thereby reducing friction at the interface between the optical head and the recording medium.

Figure 8:
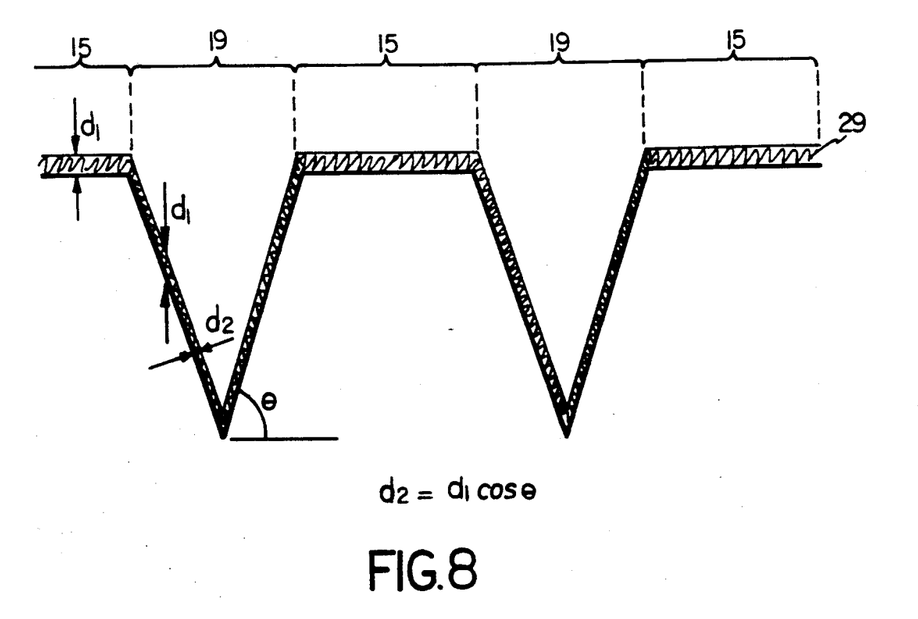
FIG. 8 is a schematic sectional view showing the sputtering of magnetic material onto a corrugated medium surface.

FIG. 8 shows an alternative method of manufacture of recording and non-recording track regions according to the invention. The surface of a prototype medium is corrugated in a series of grooves which follow the pattern of the desired recording and non-recording track regions. These corrugations generally form a V-shape. The prototype medium may be created, in preferred embodiments, by forming the V-shaped grooves in a metal master through conventional metal etching techniques. Copies of the master may then be pressed into magnetically inert media, as discussed above in conjunction with FIGS. 7A through 7C.

To form recording and non-recording tracks in the embodiment of FIG. 8, magnetic material is sputtered onto the surface of the pressed inert medium. Material accumulates on the medium surface at a constant vertical thickness. That is, the material thickness d1 is roughly constant throughout the surface of the medium. However, the thickness of the magnetic material in the normal direction is substantially less within the V-shaped corrugations. That is, the thickness d2 is substantially less than the thickness d1 because of the V-shaped corrugations. The thicknesses d2 and d1 are related by the cosine of the angle $\Theta$ of the V-shape, as shown in the figure. In preferred embodiments, the V-shaped groove is relatively deep, that is, deeper than ¼ of the wavelength of the magneto-optical laser, so that the angle $\Theta$ approaches 90°. The uneven distribution of magnetic material is carefully controlled such that the V-shaped regions 19 are substantially less susceptible to magnetic recording than the flat regions 15. In this way, the flat regions 15 comprise recording tracks, whereas the V-shaped regions 19 comprise non-recording tracks.

Figure 9:
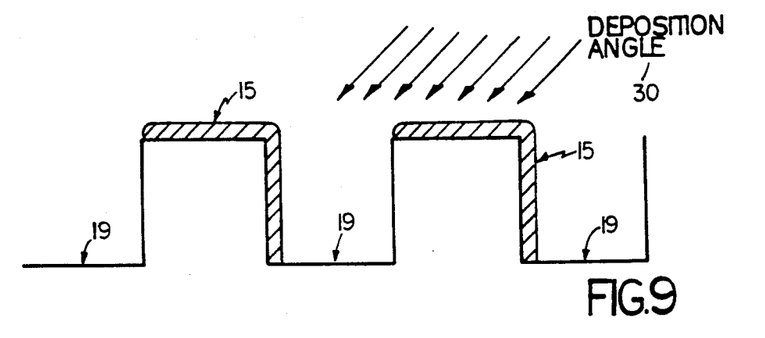
FIGS. 9 and 10 are schematic sectional views showing the angular deposition of magnetic material onto a corrugated medium surface.

FIG. 9 shows another alternative method of manufacture of recording and non-recording track regions according to the invention. The surface of the medium is corrugated in a series of raised tracks 15 which follow the pattern of the desired recording and non-recording tracks. Magnetic material is deposited on the surface of the medium at a deposition angle 30 such that material accumulates in the raised regions 15 but does not accumulate in the lower regions 19. Because of the resulting uneven distribution of magnetic material, the raised regions 15 comprise recording tracks, whereas the lower regions 19 comprise non-recording tracks.

Figure 10:
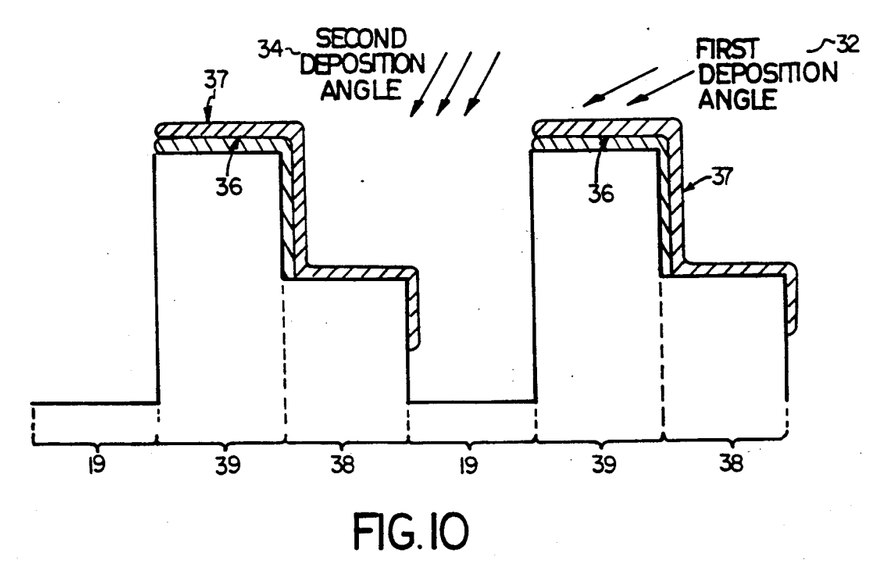

The above has discussed the invention in light of particular embodiments. This description should be viewed as illustrative, and not as a limitation. Other embodiments fall within the spirit of the invention. For example, FIG. 10 shows an alternative embodiment of the invention, wherein a first deposition angle 32 and a second deposition angle 34 are used to deposit materials on a corrugated medium face having several different raised areas. Material 36 accumulated on the medium face from the first deposition angle 32 may cover a different area of the medium face than material 37 accumulated from the second deposition angle 34. In this way, some regions 19 may be characterized by the lack of any material, other regions 38 may be characterized by the presence of one material, and still other regions 39 may be characterized by the presence of both materials. These different regions may then be susceptible to different types of magnetic or other recording according to the invention.

Figure 11:
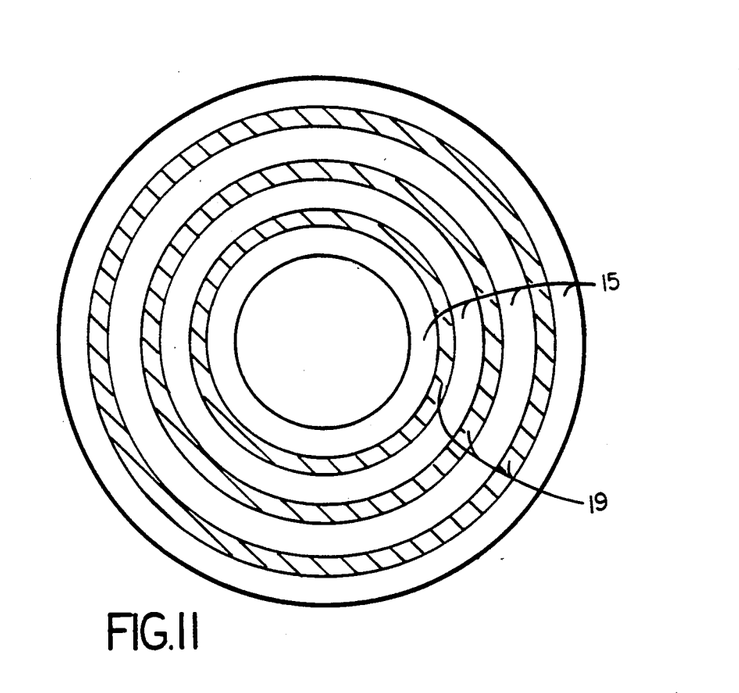
FIG. 11 is a diagrammatic top view of an alternative embodiment of a magneto-optical diskette.
Figure 12:
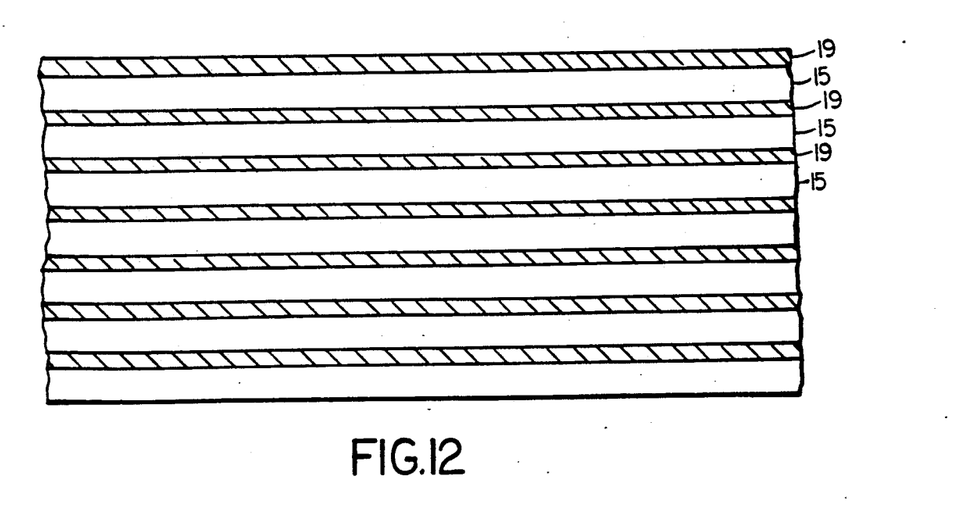
FIG. 12 is a diagrammatic top view of a magneto-optical storage card.

FIG. 11 shows another alternative embodiment of the invention, wherein the recording and non-recording tracks form concentric tracks on a diskette medium. FIG. 12 shows another alternative embodiment of the

What is claimed is:

1. An optical data storage medium comprising:
   multiple alternately disposed, or single spiral, recording and non-recording regions forming continuous, nonintersecting tracks in said medium, said recording tracks having a substantially smooth topography and being responsive to a recording signal for recording information by modulation of a physical property of said medium other than reflectivity, said non-recording track having a textured topography, the dimensions of the textured features being substantially smaller than the width of said tracks but of sufficient size to make said non-recording track relatively unresponsive to said recording signal compared to said recording track.

2. The optical storage disk of claim 1, wherein said modulated physical property is the magnetization of said recording track region.

3. An optical data storage apparatus, comprising:
   an optical data storage disk having two faces;
   multiple alternately disposed, or single spiral, recording and non-recording tracks in a given radial width of one disk face, said recording track having a substantially smooth topography and being responsive to a recording signal for recording information by modulation of a physical property of said medium other than reflectivity, said non-recording track having a textured topography, the dimensions of the textured features being substantially smaller than the width of said tracks but of sufficient size to make said non-recording track relatively unresponsive to said recording signal compared to said recording track; and
   means for directing a light beam towards said one disk face, the distribution of intensity of the focused laser beam being such that the intensity of the portion of the beam illuminating the desired recording track is sufficiently greater than the intensity of the portions of the beam illuminating other recording tracks to produce a low error rate.

4. The apparatus of claim 3, wherein said modulated physical property is the magnetization along said recording tracks.

5. A method of manufacture of an optical data storage medium comprising the steps of:
   providing a master;
   forming a pattern of regions arranged in multiple, or single spiral, continuous, nonintersecting bands on said master, including a first region of substantially smooth topography and a second region of textured topography, the dimensions of the textured features being substantially smaller than the width of said tracks but of sufficient size to make the second region relatively light-absorbent as compared to said first region;
   providing a medium comprised of inert material which does not react to a given recording stimulus;
   contacting said medium with the patterned face of said master to emboss said medium face with a copy of said regions;
   depositing on said medium reactive material which reacts to said given recording stimulus.

6. The method of claim 5, wherein said given recording stimulus is exposure to magnetic flux.

7. The method of claim 6, wherein said medium is a disk having two faces.

8. A recording medium, comprising:
   a substrate with single spiral or multiple substantially parallel, spaced tracks in at least one area, the surfaces of said tracks being flat and coplanar, the intertrack regions of the substrate occupying the space between said tracks, extending along substantially the entire length of said tracks, and having a textured topography, the dimensions of the textured features being substantially smaller than the width of said tracks but of sufficient size to make the intertrack regions of the substrate relatively unsusceptible to recording or reading information as compared to within the tracks themselves.

9. The medium of claim 8, wherein a layer of magnetic material for magneto-optical recording is deposited over a first face of said substrate substantially assuming the topography of said substrate.

10. The medium of claim 9, wherein said substrate transmits radiation incident on a second face of said substrate to and from the magnetic material deposited on said first face.

11. The medium of claim 8, wherein a layer of phase transition material for phase transition recording is deposited over said substrate substantially assuming the topography of said substrate.

12. A method of manufacture of an optical data storage medium comprising the steps of:
    providing a medium comprised of inert material which does not react to a given recording stimulus;
    depositing, on one medium face, reactive material which does react to said given recording stimulus,
    forming, over said reactive material, a coating of hydrogenated carbons,
    exposing said coating to ion beam bombardment along a continuous track such that said track becomes more absorbing to light.

13. The method of claim 12, further comprising adjusting the energy of ion beam bombardment to control the degree of absorptivity.

14. The method of claim 13, wherein said energy is varied over said track to provide a track with nonuniform absorptivity.

15. The method of claim 12, further comprising performing such exposure of said coating so as to form closely spaced areas which collectively define a track with increased absorptivity.

* * * * *